United States Patent [19]

Matsuura

[11] Patent Number: 5,013,090
[45] Date of Patent: May 7, 1991

[54] SKIN COVERED FOAMED PLASTIC SEAT WITH IDENTATIONS

[75] Inventor: Ichiro Matsuura, Ayase, Japan

[73] Assignee: Ikeda Bussan Co., Ltd., Kanagawa, Japan

[21] Appl. No.: 410,079

[22] Filed: Sep. 20, 1989

[30] Foreign Application Priority Data

Oct. 25, 1988 [JP] Japan .................... 63-139142[U]

[51] Int. Cl.⁵ .................................................. A47C 7/18
[52] U.S. Cl. ........................ 297/452; 297/DIG. 1; 264/46.6; 264/275; 5/471
[58] Field of Search .......... 297/452, DIG. 1, DIG. 2; 264/46.4, 46.6, 46.7, 46.8, 275; 5/404, 471, 481

[56] References Cited

U.S. PATENT DOCUMENTS

| | | |
|---|---|---|
| 3,648,334 | 3/1972 | Swalm . |
| 3,869,760 | 3/1975 | Meyer . |
| 4,323,406 | 4/1982 | Morello ........................ 264/275 X |
| 4,512,680 | 4/1985 | Tomaszewski . |
| 4,555,141 | 11/1985 | Nemoto ............................ 297/452 |
| 4,833,741 | 5/1989 | Mizuno et al. ..................... 5/471 |
| 4,853,995 | 8/1989 | Bethell et al. ..................... 297/452 |

FOREIGN PATENT DOCUMENTS

| | | |
|---|---|---|
| 933761 | 8/1963 | United Kingdom . |
| 1163492 | 9/1969 | United Kingdom . |
| 1190183 | 4/1970 | United Kingdom . |
| 1273709 | 5/1972 | United Kingdom . |
| 1275065 | 5/1972 | United Kingdom . |
| 1552023 | 9/1979 | United Kingdom . |
| 1591003 | 6/1981 | United Kingdom . |
| 2214070 | 8/1989 | United Kingdom . |

*Primary Examiner*—Peter R. Brown
*Attorney, Agent, or Firm*—Weiser & Stapler

[57] ABSTRACT

A skin covered foamed plastic seat with indentations in which it is possible to obtain indentations of the desired shape at the desired location. The skin covered foamed plastic seat includes a clip for securing engagement between the sewed up portions of the skin cover and the protrusions provided on the molding surface, having a shape enabling a tight gripping of the clip on the protrusions, and having holes connecting an inner side of the clip with an outer side of the clip for allowing penetration of liquid foam resin into the inner side of the clip.

8 Claims, 2 Drawing Sheets

SKIN COVERED FOAMED PLASTIC SEAT WITH IDENTATIONS

BACKGROUND OF THE INVENTION

1. Field of the Invention

The present invention relates to a skin covered foamed plastic seat and, more particularly, to such a seat incorporating indentations at desired positions in a process of manufacturing.

2. Description of the Background Art

The skin covered foamed plastic seats have been utilized extensively for car seat cushions and seat backs. Among such car seat cushions and car seat backs using skin covered foamed plastic seats, there is a type of car seat cushions and car seat backs such as a seat cushion 2 and a seat back 3 of a car seat 1 shown in FIG. 1 which incorporate indentations 9. As shown in FIG. 2 for a part of the seat cushion 2, the skin covered foamed plastic seat comprises a skin cover 6 which includes a surface skin and a wadding, and a pad member 8. The indentation 9 is made from a sewed up portion 7 of the skin cover 6 pinched by a clip 17.

To manufacture such a skin covered foamed plastic seat with indentations, a mold 11 shown in FIG. 3 will be used, which comprises a lower mold 12 having protrusions 14 at location at which the indentations are to be made, and an upper mold 12 to be assembled over the lower mold 13. The skin cover 6 will be placed over the lower mold 12 with its sewed up portions 7 engaged with the protrusions 14 of the lower mold 12, and the clip 17 is attached over the sewed up portions 7 to secure the engagement between the sewed up portions 7 and the protrusions 14, and with the upper mold 13 assembled with the lower mold 12 the liquid foam resin which will become a pad member 8 after foaming process will be poured into a space between the lower mold 12 and the upper mold 13.

However, it has been difficult to make the engagement between the sewed up portions 7 and the protrusions 14 tightly secured, and the clip 17 has not been well combined with the pad member 8, both of which contributing to an instability of the clip 17. This instability of the clip 17 made it difficult to obtain indentations 9 of the desired shape at the desired location conventionally.

SUMMARY OF THE INVENTION

It is therefore an object of the present invention to provide a skin covered foamed plastic seat with indentation in which the sewed up portions of the skin cover can easily be engaged with the protrusions of the mold and the clip can be well combined with both the skin cover and the pad member, so as to be able to obtain indentations of the desired shape at the desired location.

This object is achieved by the present invention by providing a skin covered foamed plastic seat, comprising: a skin cover covering a surface of the skin covered foamed plastic seat, having sewed up portions corresponding to indentations to be made on the skin covered foamed plastic seat which are to be engaged with protrusions provided on a molding surface; a pad member to be manufactured from liquid foam resin poured onto the skin cover placed over the molding surface, having indentations to be made by the protrusions provided on the molding surface; and a clip for securing engagement between the sewed up portions of the skin cover and the protrusions provided on the molding surface, having a shape enabling a tight gripping of the clip on the protrusions, and having holes connecting an inner side of the clip with an outer side of the clip for allowing penetration of liquid foam resin into the inner side of the clip.

Other features and advantages of the present invention will become apparent from the following description taken in conjunction with the accompanying drawings.

DETAILED DESCRIPTION OF THE PREFERRED EMBODIMENTS

Figure 1:
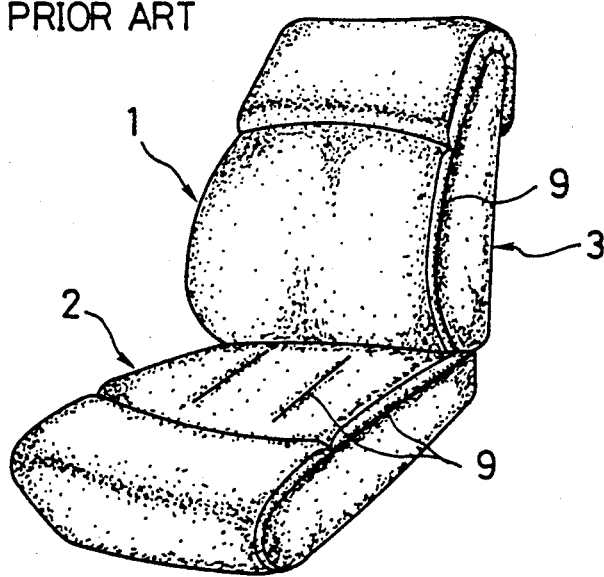
FIG. 1 is a perspective view of a car seat using skin covered foamed plastic seats with indentations.
Figure 2:
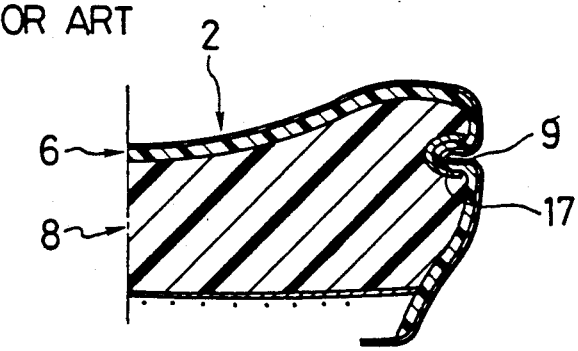
FIG. 2 is a partial cross sectional view of a conventional skin covered foamed plastic seat with indentations for a seat cushion of the car seat of FIG. 1.
Figure 3:
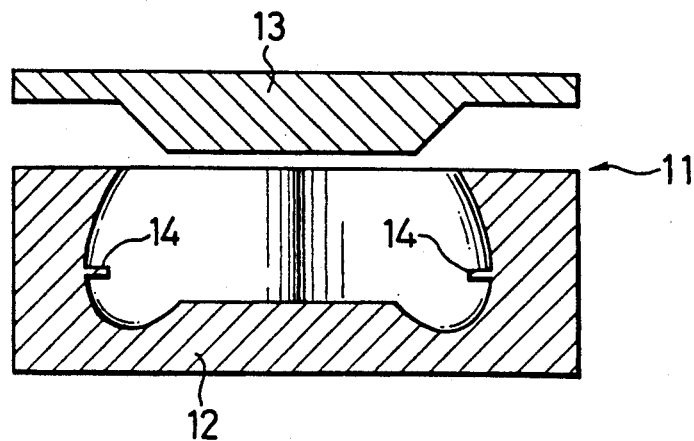
FIG. 3 is a cross sectional view of a mold for manufacturing a conventional skin covered foamed plastic seat with indentations.
Figure 4:
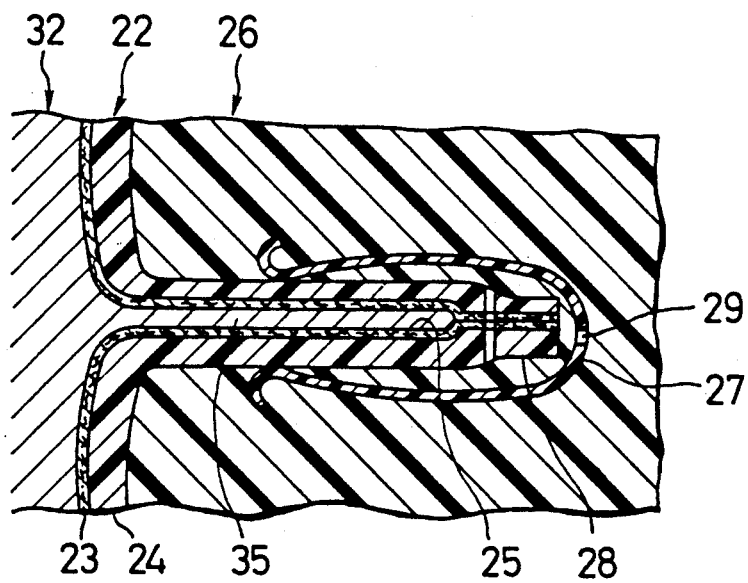
FIG. 4 is a partial cross sectional view of one embodiment of a skin covered foamed plastic seat with indentations according to the present invention.

Referring now to FIG. 4, there is shown a partial view of one embodiment of a skin covered foamed plastic seat with indentations according to the present invention.

In this embodiment, the skin covered foamed plastic seat, to be manufactured in a lower mold 32, comprises a skin cover 22 which includes a surface skin 23 and a wadding 24, and a pad member 26. An indentation 25 is made on a side of the pad member 26 from a sewed up portion 28 of the skin cover pinched by a clip 27 made of a synthetic resin such as an acrylic resin or nylon, by means of a protrusion 35 provided on the lower mold 32.

Figure 5:
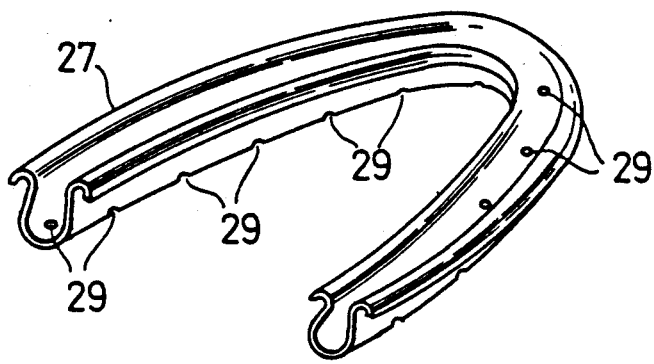
FIG. 5 is a perspective view of a clip to be used in the embodiment of a skin covered foamed plastic seat of FIG. 4.

As shown in FIG. 5, the clip 27 has an approximate horseshoe-like cross section to grip tightly on the protrusion 35, with curved out edges for an ease of attachment, and a curved overall shape in accordance with a circumferential shape of the indentation 25 around the skin covered foamed plastic seat. In addition, the clip 27 possesses multiplicity of holes 29 at its round bottom which allow penetration of liquid foam resin to be poured over the skin cover 22 into an inner side of the clip 27.

Figure 6:
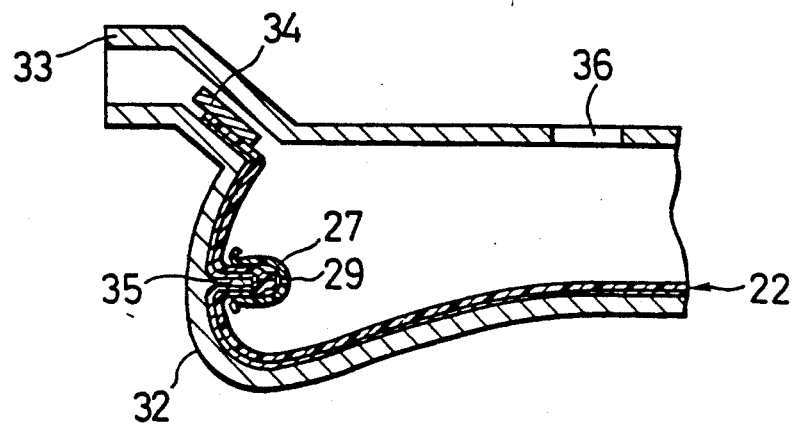
FIG. 6 is a partial cross sectional view of a mold for manufacturing a skin covered foamed plastic seat with indentations in a manufacturing process of the skin covered foamed plastic seat of FIG. 4.

As shown in FIG. 6, a mold for manufacturing this skin covered foamed plastic seat comprises, in addition to the lower mold 32 with the protrusion 35 on its side, an upper mold 33 with an opening 36 from which the liquid foam resin is to poured over the skin cover 22 placed on the lower mold 32, and a middle mold 34 to be placed between the lower mold 32 and the upper mold 33 for pinching the edges of the skin cover 22 to secure the position of the skin cover 22 on the lower mold 32.

Thus, the skin covered foamed plastic seat is manufactured by first placing the skin cover 22 over the lower mold 32 such that the sewed up portion 28 is engaged with the protrusion 35 of the lower mold 32, then assembling the middle mold 34 and the upper mold 33 with the lower mold 32 such the middle mold 34 pinches the edges of the skin cover 22, and then pouring the liquid foam resin through the opening 36 of the upper mold 33 into a space formed between the upper mold 33 and the lower mold 32, over the skin cover 22, which will subsequently become the pad member 26 combined with the skin cover 22 and the clip 27 after the foaming process.

Here, because of the penetration of the liquid foam resin through the holes 29 of the clip 27, the inner side of the clip can completely be filled with the liquid foam resin which can make the clip 27 tightly fixed at its position by the pad member 26 formed continuously from an outer side of the clip 27 to the inner side of the clip 27 through the holes 29 of the clip 27.

Thus, in this embodiment, it is possible to provide a skin covered foamed plastic seat with indentation in which the sewed up portion 28 of the skin cover 22 can easily be engaged with the protrusion 35 of the mold and the clip 27 can be well combined with both the skin cover 22 and the pad member 26, so as to be able to obtain the indentation 25 of the desired shape at the desired location.

It is to be noted that the holes 29 of the clip 27 in the above embodiment may be in a shape of slits or other shapes instead of being in shape of holes. Also, the horseshoe-like cross section of the clip 27 in the above embodiment may be replaced by other suitable shape and the holes 29 may be displaced from their location at the round bottom in the above embodiment, so long as the same functions of the clip 27 as in the above embodiment are obtainable.

Besides these, many modifications and variations of the above embodiment may be made without departing from the novel and advantageous features of the present invention. Accordingly, all such modifications and variations are intended to be included within the scope of the appended claims.

What is claimed is:

1. A skin covered foamed plastic seat, comprising:
    a pad member made from liquid foam resin having at least one indentation;
    a skin cover covering a surface of the skin covered foamed plastic seat and having sewed up portions located at the indentation of the pad member; and
    a clip attached to the sewed up portions of the skin cover, the clip having a plurality of holes connecting an inner side of the clip with an outer side of the clip for allowing penetration of the liquid foam resin and extension of the pad member into the inner side of the clip, the clip having an approximate horseshoe shaped cross section, where in the sewed up portions are tightly gripped by, and are inserted into the inner side of the clip, said sewed up portions being pinched between opening ends of the horseshoe shaped cross section.

2. The skin covered foamed plastic seat of claim 1, wherein the horseshoe shaped cross section of the clip has an axis of symmetry and each one of the holes of the clip is located on the axis of symmetry of the clip.

3. The skin covered foamed plastic seat of claim 1, wherein the inner side of the clip and the sewed up portions have a space filled with the liquid foam resin therebetween.

4. The skin covered foamed plastic seat of claim 1, wherein the openings ends of the horseshoe shaped cross section of the clip are curled outward.

5. A method of manufacturing a skin covered foamed plastic seat with a molding surface having protrusions and with a clip having an approximate horseshoe shaped cross section and holes connecting an inner side of the clip with an outer side of the clip, comprising the steps of:
    placing a skin cover having sewed up portions on the molding surface having protrusions, wherein the sewed up portions are engaged with the protrusions;
    attaching the clip for securing engagement between the sewed up portions of the skin cover and the protrusions of the molding surface to the sewed up portions of the skin cover, wherein the sewed up portions are tightly gripped by the clip by being inserted into the inner side of the clip and pinched between opening ends of the horseshoe shaped cross section;
    pouring liquid foam resin over the skin cover on the molding surface, to form a pad member having indentations at positions of the sewed up portions of the skin cover while the clip remains attached to the sewed up portions, the liquid foam resin being directed through said holes of said clip to allow penetration of liquid foam resin to make the pad member into the inner side of the clip; and
    removing from the molding surface the skin covered foamed plastic seat made of the skin cover combined with the pad member, wherein the clip remains attached to the sewed up portions of the skin cover.

6. The method of claim 5, where in the step of pouring liquid foam resin is performed to direct the resin through each one of the holes of the clip at an axis of symmetry of the horseshoe shaped cross section.

7. The method of claim 5, wherein the step of pouring liquid foam resin is performed to direct the resin to fill a space between the inner side of the clip and the sewed up portions.

8. The method of claim 5, wherein the opening ends of the horseshoe shaped cross section of the clip are curled outward and the step of attaching the clip is performed by sliding the sewed up portions in the curled ends of the clip.

* * * * *